United States Patent Office 3,002,085
Patented Sept. 26, 1961

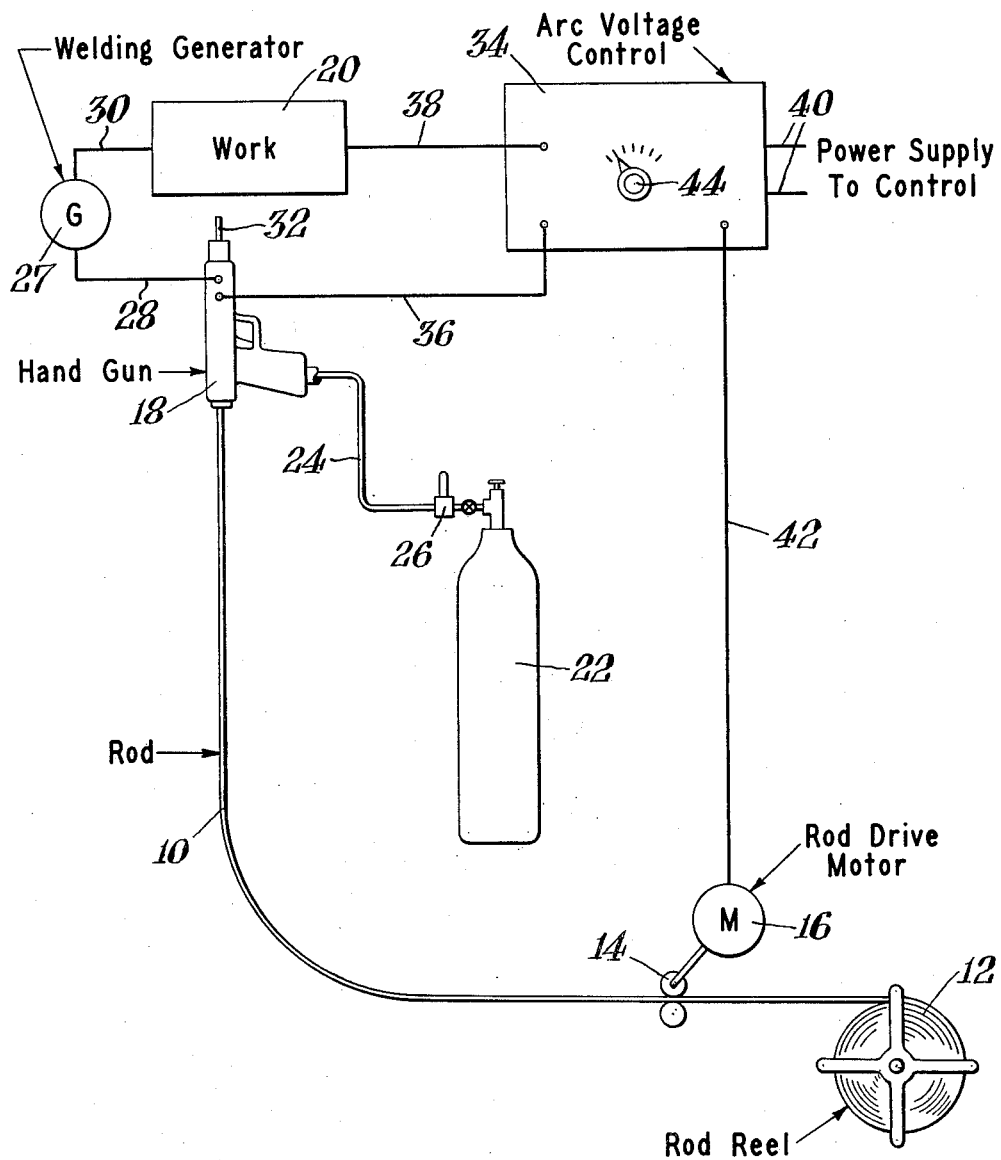

3,002,085
GAS-SHIELDED METAL-ARC WELDING PROCESS
Roscoe R. Lobosco, Elizabeth, Thomas McElrath, Jr., Chatham, and Wilbur H. Helmbrecht, Union, N.J., assignors to Union Carbide Corporation, a corporation of New York
Filed May 29, 1951, Ser. No. 228,888
6 Claims. (Cl. 219—130)

This invention relates to shielded-inert-gas-metal-arc or sigma welding, and more particularly to such welding with a shielding gas consisting essentially of argon.

In the past, the sigma welding of aluminum and alloys thereof, when the shielding gas was commercially pure argon, resulted in welds which contained undesirable porosity, especially in vertical and overhead multi-pass position welding. Prior attempts to solve such problem have been unsuccessful or impractical.

The main object of this invention is to solve such problem. Another object is to provide an improved process of metal-arc welding in a shielding gas composed mainly of argon which is more efficient and effective, and results in sounder and structurally stronger welds than has been possible heretofore. A further object is to provide an improved gas for sigma welding.

According to the invention such objects are accomplished by automatically feeding a fusible metal electrode rapidly toward the welding arc in response to the voltage between such electrode and the work, at a rate such that the arc voltage is kept at a substantially constant critical value during the welding operation. In general for aluminum the welding voltage (between torch and work) must not be less than 20 volts and not more than 30 volts. For position welding of aluminum the welding voltage preferably should be between 23 and 27 volts, inclusive, for porosity free welds. In any case the arc voltage must be kept within ±0.5 volt of the selected value. The welding arc is shielded by oxy-argon gas composed of argon containing up to 20% oxygen, 2%-7% being preferred. It is essential also that such shielding gas be substantially dry, i.e., contain less than 6 grains of water vapor per thousand cubic feet thereof. The combination of such close automatic arc voltage control with such dry oxy-argon shielding gas not only virtually eliminates porosity in the resulting weld, but avoids arc instability even at relatively low current densities, and makes possible the welding of even the most difficult joint assemblies with little difficulty.

Another benefit derived from the automatic voltage control described above is as follows: Prior equipment employed a constant wire feed. The operator had to adjust and set the wire feed speed to match the welding current. A change in welding current either intentional, or as a result of varying welding generator current output, required manual resetting of the wire feed speeds. However, with our automatic voltage responsive speed control, changes in current output, either intentional, or not, require no action or effort on the part of the operator. Any preselected arc voltage is automatically maintained regardless of changes in current. This frees the operator from the necessity of making adjustments during welding.

An unexpected advantage of the invention is that it makes possible stable welding at substantially lower welding current densities than was possible prior thereto, thus larger and more economical welding rods can be used without loss of stability.

In the drawing:

The single figure is a diagram of apparatus illustrating the invention.

As shown in such drawing, a fusible metal electrode 10 in the form of a bare rod or wire is drawn from a supply reel 12 by an electrode feed mechanism 14, which is driven by a motor 16, and fed toward fusible metal work 20 through a hand gun 18 like, for example, that disclosed in the application of Thomas McElrath, Jr., Serial No. 76,063, filed February 12, 1949. The gun 18 is supplied with substantially dry, oxy-argon gas from a tank or cylinder 22 through a gas conduit 24 containing a combined gas pressure regulator and flowmeter 26. The gun 18 and the work 20 are connected to a suitable source of welding current such as a welding generator 27 by a circuit including work and ground leads 28 and 30, whereby a metal fusing or welding arc is formed between the business end 32 of the electrode 10 and the work 20 during the welding operation. Such arc and the adjacent metal are shielded from the atmosphere by a stream of such oxy-argon gas which is discharged by the gun nozzle about and in the same direction as the electrode 10.

The rod feed is controlled automatically by an arc voltage control 34 such, for example, as that disclosed in the application of Roscoe R. Lobosco, Serial No. 170,597, filed June 27, 1950, for "Automatic Metal Arc Welding System"; capable of keeping the arc voltage within ±0.5 volt of the selected value. The voltage between the electrode 10 and the work 20 is supplied to such control 34 by conductors 36 and 38 connected to the gun and work, respectively. Power is supplied to the control 34 through suitable leads 40, and the rod drive motor 16 is connected to the control 34 by a circuit including a conductor 42. A desired arc voltage is selected by adjusting a knob 44 provided for this purpose on the control 34. The arc voltage control 34 thereupon functions automatically to energize the motor 16 to feed the electrode 10 rapidly toward the arc in response to the voltage drop between the electrode and the work at a rate such that the arc voltage is kept substantially at the selected value.

The oxy-argon gas is composed of a mixture of argon and oxygen similar to that disclosed in the application of Rudolph Thomas Breymeier, Serial No. 210,397, filed February 10, 1951, for "Oxy-Argon Gas-Shielded Metal-Arc Welding." We have discovered, however, that such gas should be substantially dry, that is to say, contains not more than 6 grains of water vapor per thousand cubic feet of such gas for welding aluminum and alloys thereof.

An arc is struck between the business end 32 of the electrode and the work 20 which progressively fuses the metal of the electrode and of the work as the rod is fed toward the arc and the hand gun is moved along the path to be welded, welding electrode metal on the work, even when the work is above the gun. By virtue of the use of such oxy-argon shielding gas, which is relatively dry, and such close automatic arc voltage control, the resulting welds are sound and exceptionally free of porosity even when the metal being welded is aluminum and one pass or layer of weld metal is made on another.

Oxy-argon provides remarkable benefits with respect to the elimination of porosity under the same closely-controlled conditions which tend only to minimize porosity with pure argon. In addition it has been found that the maximum welding speed in oxy-argon is almost twice that in pure argon, that a stringer-bead technique can be readily and satisfactorily employed, thereby minimizing adverse heat effects in the welding of heat-treated metals. Such highly-desired welding results can, however, only be achieved with closely-controlled welding conditions, and the need for fine voltage control is even more pronounced with oxy-argon than with pure argon.

For example, overhead T fillets were made in 52S aluminum plate using $\frac{1}{16}$-inch diameter welding rod. The range of welding conditions was explored to determine conditions which would yield porosity-free single-pass welds using the minimum gas flow. These conditions, with direct current-reverse polarity, were established as follows:

Welding current, amperes _____ 150–220
Arc voltage _____ 23–27
Argon flow, c.f.h _____ 135–140

While porosity-free welds could be consistently made over a relatively wide range of welding currents as noted above, the range of usable arc voltage was extremely narrow. Below 23 volts, porosity occurred regardless of other welding conditions. Above approximately 27 volts, while porosity-free welds could be made, the arc length corresponding to such high voltages became excessive and it was found difficult to control the contour of the welding bead and to obtain desirable welding speeds from the standpoint of heat effect in the work.

Additions of oxygen to argon in the range of 1 to 20 percent were tried with a cup spacing of about ½ inch from the work. With all oxygen additions it was noted that the entire character of the arc was changed, being substantially shorter in length for equivalent arc voltages, producing some spatter, and having some degree of directional instability. It was further observed that the speed of welding could be substantially increased, i.e., to 35 or 40 i.p.m., without incurring cold laps. Subsequent examination of multi-pass fillet welds showed very little if any benefit porosity-wise to oxygen additions below about 5 percent, but at all percentages above 5 percent and up to 20 percent porosity was virtually eliminated. (Above 7 percent spatter became very excessive and the surface of the weld metal showed extreme evidence of oxidation.) The optimum range of oxygen additions from the standpoint of porosity and minimum spatter, therefore, are 5 to 7 percent for such cup spacing relative to the work when the latter is aluminum. For welding other metals according to the invention the oxygen content in the argon can be as low as 2% oxygen.

Exploring the ranges of welding current and arc voltage it was found that the previous limitations established for pure argon continued to prevail. Even with oxygen addition in the optimum range, it was found that the use of voltages below 23 inevitably produced porosity. With the elimination of porosity and the increased speed with which weld passes could be made, it became apparent that oxy-argon might yield suitable conditions for utilizing the stringer bead technique.

Since all of the above oxy-argon tests were made using cylinder argon mixed with oxygen as supplied from a Cascade oxygen unit, the possible effect of moisture in oxygen was investigated. Preliminary tests were conducted using an oxygen therapy humidifier to introduce water vapor in the oxygen. All subsequent welds made with humidified oxygen showed an extremely large amount of porosity irrespective of the amount of oxygen or the welding conditions employed. Even after the humidifier was removed from the system, welds continued to contain various amounts of porosity, evidently due to residual water vapor in the lines supplying shielding gas. In order to re-establish good welding conditions, it was found necessary to replace all hose used in these tests. These results strongly indicate that even small traces of water vapor contribute to the formation of porosity in aluminum welds.

More quantitative tests were made comparing results obtained using aviators' breathing oxygen, which is considered to be as dry as available, and water-pumped oxygen in cylinders. All tests made with the aviators' breathing oxygen using a 5 percent addition to argon showed virtually no porosity in all multi-pass welds. Under identical welding conditions similar welds were made using water-pumped oxygen at cylinder pressures of 2200, 1100 and less than 100 p.s.i. pressure. Examination of weld samples showed no substantial difference in porosity level as a result of changes in water vapor content which occur at the various cylinder pressures involved, but all samples contained small amounts of porosity. On the basis of these tests it can be more definitely concluded that water vapor, even in relatively small quantities, is detrimental to the welding results where porosity is a factor.

In all of our investigations on sigma welding of aluminum undertaken to date, it has been found beneficial to hold the torch with the cup as close as practical to the work. It had been apparent in the previous work that the protection afforded the weld puddle by the shielding gas had been more consistent with the close cup spacing and tended to become erratic with longer cup spacings. However, in our trials with oxy-argon it was discovered that a cup spacing of approximately 1 inch, which is considerably greater than that established by previous techniques, yielded more consistent results with regard to the elimination of porosity. This factor has been thoroughly checked and the results have been confirmed, but as of this date there is no apparent explanation for this phenomenon. Using this modified technique, that is a cup-to-work spacing of 1 inch, it was found possible to retain the beneficial results of oxy-argon mixtures with oxygen percentages as low as 2 percent with a total flow of 50 c.h.f. Subsequent tests have, however, disclosed that 5 percent oxygen in argon does produce slightly better and more consistent results than 2 percent.

While the invention solves the problem of porosity in the dry oxy-argon sigma welding of aluminum, it is equally applicable to other metals such as stainless steels, low carbon steels and high-alloy steels. As a matter of fact, the welding of steel according to the invention results in compensation of the otherwise erratic behavior of the arc length which occurs at relatively low current densities which are normally not usable with constant-rate rod feed. Due to the automatic arc length control the arc length is relatively stable even at such relatively low current densities; thus reducing the value of the required current for any given sized rod. Thus, rods of larger diameter can be used—reducing the cost of the operation.

We claim:

1. Process of metal-arc welding which comprises striking a metal fusing arc between a fusible metal electrode and fusible work, supplying arc welding current through such electrode and the work of sufficient intensity to overcome gravity in the transfer of metal from the electrode to the work, shielding such arc and the adjacent metal from the atmosphere with relatively dry oxy-argon gas having a water vapor content of less than 6 grains of moisture per 1000 cubic feet of gas, and automatically feeding the electrode toward the arc in response to the arc voltage at a rate such that the arc voltage is kept at a substantially constant critical value of ±0.5 volt of a selected arc voltage of not less than 20 volts and not more than 30 volts.

2. Process of metal-arc welding which comprises striking a metal fusing arc between a fusible metal electrode and the work, supplying arc welding current through such electrode and the work of sufficient intensity to overcome gravity in the transfer of metal from the electrode to the work, simultaneously flowing a stream of relatively dry gas having a water vapor content of less than 6 grains of moisture per 1000 cubic feet of gas composed essentially of dry argon containing up to 20% relatively dry oxygen, over such arc and the adjacent metal of the electrode and work, automatically feeding the electrode rapidly toward the arc in response to the voltage drop such electrode and the work at a rate such that the arc voltage is kept at a substantially constant critical value of ±0.5 volt of a selected arc voltage of not less than 20 volts and not more than 30 volts, moving such electrode and the gas stream relatively to the work along the path to be welded, progressively fusing the metal of the work and electrode by such arc and welding electrode metal on the work, resulting in a weld which is sound and relatively free of porosity by virtue of such flow of such stream of dry oxy-argon gas over the arc and such automatic maintenance of the arc voltage at such critical value.

3. Process of position welding aluminum and the like which comprises striking a metal fusing arc between an aluminum electrode and the work, supplying arc welding current through such electrode and the work of sufficient intensity to overcome gravity in the transfer of metal from the electrode to the work, simultaneously flowing a stream of relatively dry oxy-argon gas having a water vapor content of less than 6 grains of moisture of 1000 cubic feet of gas composed of argon and up to about 2% oxygen, over such arc and the adjacent metal of the electrode and work, automatically feeding the electrode rapidly toward the arc in response to the voltage drop between such electrode and the work at a rate such that the arc voltage is kept at a substantially constant predetermined value of ±0.5 volt of a selected arc voltage of not less than 23 volts and not more than 27 volts, manually movng such electrode and the gas stream relatively to the work along the path to be welded, progressively fusing the metal of the work and electrode by such arc and depositing electrode metal on the work, resulting in an aluminum weld which is sound and relatively free of porosity by virtue of such dry gas and the automatic maintenance of the arc voltage at such value.

4. A gas-shielded metal-arc welding apparatus comprising the combination with a metal arc welding torch provided with means for discharging a fusible metal electrode and a stream of arc shielding gas having a water vapor content of less than 6 grains of moisture per 1000 cubic feet of gas, means for feeding such electrode through said torch, means for supplying welding current to said arc through such electrode and the work of sufficient intensity to overcome gravity in the transfer of metal from the electrode to the work, and means for supplying such shielding gas to said torch; of means for avoiding porosity in the resulting weld comprising an arc voltage control having an arc voltage responsive input circuit connected across such arc, and an electrode feed output circuit connected to said electrode feeding means, including means which feeds the electrode automatically at such a rate toward the arc that the arc length is kept at a substantially constant critical value such that the arc voltage does not vary more than ±0.5 volt from such value during the welding operation.

5. Apparatus as defined by claim 4, in which the arc voltage control is provided with adjustable means for setting the arc voltage.

6. Process of position welding aluminum and alloys thereof in an overhead position by the stringer bead technique with a minimum of porosity in the resulting weld, which comprises striking an arc between the end of a wire composed of aluminum and the work with a sigma welding torch, shielding said arc with a stream of gas comprising argon which gas contains less than 6 grains of water vapor per 1000 cubic feet of gas, feeding said wire toward the arc at a rate such that the arc voltage is automatically kept constant within ± 0.5 volt of an arc voltage falling between 23 to 27 volts, while manually holding said torch so that the wire is fed toward the work from a point below such work, and moving the torch with respect to the work, making a complete deposition along the length of the seam to be welded and subsequently overlaying such deposition repeatedly, whereby beads of weld metal are applied on the work and on one another with a minimum amount of porosity by virtue of such critical arc voltage control and the use of such gas which is relatively dry.

References Cited in the file of this patent

UNITED STATES PATENTS

| | | |
|---|---|---|
| 1,746,209 | Alexander | Feb. 4, 1930 |
| 2,053,417 | Brace | Sept. 8, 1936 |
| 2,504,868 | Muller et al. | Apr. 18, 1950 |
| 2,510,205 | Baird | June 6, 1950 |
| 2,602,871 | Noland et al. | July 8, 1952 |

OTHER REFERENCES

Huff et al.: The Welding Journal, Feb. 1949, p. 135.

Journal American Welding Society, December 1926, p. 13.

Welding Encyclopedia, 12th ed. 1947, p. 658.